Sept. 19, 1967     J. H. CROKER     3,342,622
TYPEWRITER RIBBON IMPREGNATED WITH INK COMPRISING
HEAT-POLYMERIZABLE ESTER MONOMER
Filed Aug. 10, 1964
TYPEWRITER RIBBON FABRIC
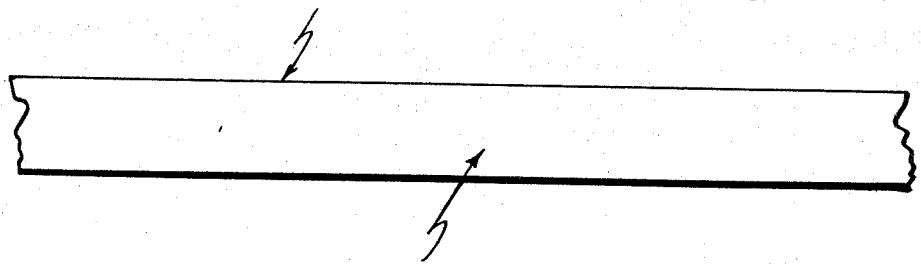
Fabric impregnated with a composition containing: A heat-polymerizable ester monomer, a low temperature catalyst and an inhibitor effective at room temperature.
INVENTOR
JOHN H. CROKER
BY *Cushman, Darby & Cushman*
ATTORNEYS 3,342,622
TYPEWRITER RIBBON IMPREGNATED WITH INK COMPRISING HEAT-POLYMERIZABLE ESTER MONOMER
John Henry Croker, Broxbourne, England, assignor to Gestetner Limited, London, England, a British company
Filed Aug. 10, 1964, Ser. No. 388,680
4 Claims. (Cl. 117—36.1)

This invention relates to lithography and, more particularly, to a method and materials for the production of imaged plates for use in offset lithography.

The fundamental feature of a plate for use in offset lithography is that its image areas should be receptive of greasy printing ink, i.e. olephilic, while the non-image areas of the plate should be, when wetted, ink-repellent. Hence a plate having an essentially hydrophilic surface may be imaged by applying to it an oleophilic imaging material. Such images may be produced by drawing, brushing, ruling or writing on the plate, or typewriting on the plate, using an essentially oleophilic ink. Such inks are commonly based on oleophilic oils, waxes or greases with suitable additions of pigments or dyes. They are anchored onto the plate by absorption into the surface of the plate.

It is an object of the present invention to provide a new method of making imaged lithographic plates which have in particular the advantage of a long working life, i.e. yield long runs of prints before they become unfit for further use.

According to the present invention there is provided a method of making an imaged lithographic plate which comprises drawing, brushing, ruling, writing, typewriting, printing or otherwise delineating an image on a plate having a hydrophilic surface, using an ink comprising a heat-polymerizable acrylic ester monomer, di-allyl phthalate monomer, or di-allyl isophthalate, and thereafter subjecting the plate to heat treatment to polymerize said organic material.

The plate to which the image is applied will usually be of paper but other base materials may be employed, e.g. thin sheet aluminium alloy. The paper or aluminium plate should have a suitable smooth surface which on being wetted will then repel greasy printing ink. Suitable base materials of this type, known as planographic printing plates, are well known per se.

The ink used to form the image in accordance with the present invention contains essentially an acrylic ester, di-allyl phthalate or di-allyl isophthalate, which will polymerize on heating. This substance may be wholly monomeric or partially polymerized. Very conveniently, a solution of polymer in its monomer is used. Very suitable acrylic esters are methyl methacrylate, butyl methacrylate, monomethyl ethylene glycol acrylate, and decyl acrylate.

In order to ensure that the substance will polymerize at reasonably low temperatures, e.g. at temperatures well below those which would cause damage to the base plate, and in reasonably short time, e.g. within a few seconds, it is preferably to include a catalyst for the polymerization. Such catalysts are known per se for use in catalyzing polymerization for other purposes. Peroxides are particularly suitable and benzoyl peroxide especially so.

Since the mixture of the polymerizable substance and the catalyst for polymerization may give rise to some autopolymerization on standing it is desirable to include in the composition a polymerization inhibitor or stabilizer. These substances are also well known, favoured materials being hydroquinone and p-t-butyl catechol.

Since the compositions, therefore, contain both catalyst for the polymerization and inhibitors therefor, it is necessary to arrange, for each selected composition, that the action of the inhibitor is effective at room temperature but is substantially ineffective at elevated temperatures.

It is also desirable, in order that the inks should be visible, and also to impart body to them, to include in the compositions a proportion of a pigment or filler, e.g. carbon black.

The invention is illustrated by the drawing wherein there is shown a typewriter ribbon fabric of conventional construction and size which has been impregnated with the novel heat-polymerizable ink according to the present invention.

Thus a preferred ink composition for use in the present invention consists of a mixture of a polymerizable monomer of the aforesaid kind, a polymer derived therefrom, a polymerization catalyst, a polymerization inhibitor and a filler, all as just set forth. Other additives, e.g. dyes, may also be employed.

The ink compositions are formulated according to the particular method by which they are to be used, e.g. as inks for application by a ball-point pen or, more especially, as impregnants for typewriter ribbons. Typewriter ribbons impregnated with the new inks are therefore within the scope of the invention.

The proportions of the various constituents in the typewriter ribbon ink are ordinarily as follows:

| | |
|---|---|
| Heat-polymerizable ester monomer | 25–90% by weight. |
| Polymer derived from a said monomer | 0% to saturation, with a maximum of 75% by weight. |
| Pigment or filler | 0–20%, preferably 5–20%, by weight. |
| Dye (when present) | 0.5–1.5% by weight. |
| Polymerization catalyst | 2–5% by weight. |
| Polymerization inhibitor | 0.1%–1% by weight. |

After the plates has been imaged by means of an ink as aforesaid, it is subjected to heat treatment. Usually temperatures in excess of 100° C. are preferred and temperatures of the order of 150° C. are very suitable insofar as they reduce the time taken for the image material to polymerize. It is found that the forms of document reproduction apparatus commercially available, wherein a sheet of material is fed through a heated chamber, are very suitable for the purpose.

By this heating operation the applied image is polymerized and rendered very firmly anchored to the plate. The resulting imaged plates may be run on offset litho machines of conventional type to yield long runs of prints, the image being highly resistant to destruction by the repeated inking and wetting and being, in this respect, much superior to the normal types of greasy ink used for imaging litho plates.

It is to be noted that the ink compositions used in the present invention may also contain an oily constituent so that they function also in the manner of the previously known types of lithographic ink but at the same time yield images which, if desired, may by heating be given a substantially longer effective life. Such an oily constituent may be present in an amount up to 25% by weight of the ink. Thus a single formulated ink may serve for both the conventional method and for the novel method of the present invention.

The following examples will serve to illustrate the invention.

Example 1

Typewriter ribbon was impregnated with the following composition:

| | Gm. |
|---|---|
| Di-allyl phthalate monomer | 25 |
| Partially polymerized di-allyl phthalate (for example, that sold as Dupon resin by Food Machinery and Chemical Corporation, 161 E. 42nd St. New York, N.Y., U.S.A.) | 50 |
| Oil soluble red dye | 0.5 |
| Benzoyl peroxide | 2.5 |
| Hydroquinone | 0.01 |

An image was typed on a paper plate using this ribbon, the plate having a surface layer of insolubilised carboxymethyl cellulose.

The resulting plate was then heated for a minute at 150° C. It was then placed on an offset lithographic printing machine, treated with a priming solution of the type commonly used for lithographic plates and then used to print copies by the conventional method of offset litho printing. It was found that a long run of very satisfactory prints could be obtained.

Example 2

A typewriter ribbon is impregnated with the following ink:

| | Gm. |
|---|---|
| Di-allyl phthalate monomer | 150.0 |
| Dupon resin (as in Example 1) | 50.0 |
| p-t-Butyl catechol | 0.06 |
| Benzoyl peroxide | 3.0 |
| Oleic acid | 20.0 |
| Red pigment (Irgalite Carmine F.B.) | 45.0 |

The Dupon resin is dissolved in the di-allyl phthalate with the p-t-butyl catechol, the benzoyl peroxide and the oleic acid. The red pigment is added and the mixture ground on a three roller mill.

Example 3

An ink suitable for imaging a planographic plate with a pen or brush is prepared as follows:

| | Gm. |
|---|---|
| Decyl acrylate monomer | 100 |
| Methyl hydroquinone | 0.025 |
| Benzoyl peroxide | 4.0 |
| Oil-soluble black dye | 0.5 |

Example 4

Ink suitable for impregnating a typewriter ribbon:

| | Gm. |
|---|---|
| Mono-methyl ethylene glycol acrylate | 100 |
| Methyl hydroquinone | 0.05 |
| Benzoyl peroxide | 4.0 |
| Methyl methacrylate polymer (powder) | 10.0 |
| Carbon black | 15.0 |

I claim:

1. A typewriter ribbon impregnated with an ink comprising a heat-polymerizable ester monomer selected from the group consisting of methyl methacrylate, butyl methacrylate, monomethyl ethylene glycol acrylate, decyl acrylate, di-allyl phthalate, and di-allyl isophthalate, a low temperature catalyst to allow polymerization of the monomer at low temperatures and a polymerization inhibitor which is effective at room temperature but substantially ineffective at elevated temperatures.

2. A typewriter ribbon impregnated with an ink comprising a heat-polymerizable ester monomer selected from the group consisting of methyl methacrylate, butyl methacrylate, monomethyl ethylene glycol acrylate, decyl acrylate, di-allyl phthalate, and di-allyl isophthalate, a polymer of a said monomer dissolved therein, a low temperature catalyst to allow polymerization of the monomer at low temperatures and a polymerization inhibitor which is effective at room temperature but substantially ineffective at elevated temperatures.

3. A typewriter ribbon impregnated with an ink comprising a heat-polymerizable ester monomer selected from the group consisting of methyl methacrylate, butyl methacrylate, monomethyl ethylene glycol acrylate, decyl acrylate, di-allyl phthalate, and di-allyl isophthalate, a polymer of a said monomer dissolved therein, a polymerization inhibitor effective at room temperature but is substantially ineffective at elevtaed temperatures and a lower temperature polymerization catalyst to allow polymerization at low temperatures.

4. A typewriter ribbon impregnated with an ink comprising 25–90% by weight of a heat-polymerizable ester monomer selected from the group consisting of methyl methacrylate, butyl methacrylate, monomethyl ethylene glycol acrylate, decyl acrylate, di-allyl phthalate and di-allyl isophthalate, up to saturation with a maximum of 75% by weight of a polymer derived from a said monomer, 5–20% by weight of a pigment, 2–5% by weight of a low temperature polymerization catalyst to allow polymerization at low temperatures and 0.1–1% by weight of a polymerization inhibitor effective at room temperature but substantially ineffective at elevated temperatures.

References Cited

UNITED STATES PATENTS

| | | | |
|---|---|---|---|
| 2,103,275 | 12/1937 | Schaefer | 117—36.1 |
| 2,200,363 | 5/1940 | Kreis | 101—149.2 |
| 2,503,679 | 5/1950 | Newman | 101—149.2 |
| 3,061,454 | 10/1962 | Graf et al. | 117—36.1 |
| 3,079,351 | 2/1963 | Staneslow et al. | 117—36.1 |
| 3,274,928 | 9/1966 | Newman | 117—36.1 |

FOREIGN PATENTS

| | | |
|---|---|---|
| 1,136,354 | 9/1962 | Germany. |

MURRAY KATZ, *Primary Examiner.*

DAVID KLEIN, *Examiner.*

J. A. BELL, *Assistant Examiner.*